United States Patent
Martin

(10) Patent No.: US 8,418,647 B2
(45) Date of Patent: Apr. 16, 2013

(54) PROCEDURE AND PISTON TYPE METERING DEVICES FOR THE METERED MATERIAL SUPPLY FOR A COATING DEVICE

(75) Inventor: Herbert Martin, Weinstadt (DE)

(73) Assignee: Dürr Systems Inc., Auburn Hills, MI (US)

( * ) Notice: Subject to any disclaimer, the term of this patent is extended or adjusted under 35 U.S.C. 154(b) by 1492 days.

(21) Appl. No.: 11/551,618

(22) Filed: Oct. 20, 2006

(65) Prior Publication Data

US 2007/0090128 A1    Apr. 26, 2007

Related U.S. Application Data

(60) Provisional application No. 60/729,442, filed on Oct. 21, 2005.

(51) Int. Cl.
B05C 5/02 (2006.01)

(52) U.S. Cl.
USPC ........... 118/300; 118/302; 118/629; 239/690; 239/708; 222/134; 222/135; 222/136; 222/137; 222/249; 222/250; 222/145.5; 222/145.6

(58) Field of Classification Search .................. 118/300, 118/302, 629; 239/690, 708; 222/333, 334, 222/134–137, 249, 250, 145.1, 145.5, 145.6; 417/393; 123/51 BC, 51 BD
See application file for complete search history.

(56) References Cited

U.S. PATENT DOCUMENTS

| | | | |
|---|---|---|---|
| 2,816,822 A | | 12/1957 | Hess et al. |
| 4,767,031 A | * | 8/1988 | Proepper ................ 222/255 |
| 4,879,137 A | | 11/1989 | Behr et al. |
| 4,932,589 A | | 6/1990 | Diana |
| 4,977,911 A | | 12/1990 | Vetter et al. |
| 5,076,769 A | | 12/1991 | Shao |
| 5,163,822 A | * | 11/1992 | Koelln ................ 417/515 |
| 5,526,962 A | * | 6/1996 | Huggenberger ............ 222/276 |
| 5,911,343 A | * | 6/1999 | Keller ................ 222/145.1 |
| 5,944,045 A | | 8/1999 | Allen et al. |
| 7,051,950 B2 | | 5/2006 | Giuliano |
| 2004/0249508 A1 | | 12/2004 | Suita et al. |

FOREIGN PATENT DOCUMENTS

| | | |
|---|---|---|
| DE | 19524853 | 1/1996 |
| DE | 19937426 | 3/2001 |
| DE | 10103067 | 7/2002 |
| DE | 10110098 | 9/2002 |
| DE | 102004043014 | 3/2006 |
| DE | 102004058053 | 6/2006 |
| DE | 102006058562 A1 | 8/2008 |

(Continued)

OTHER PUBLICATIONS

International Search Report Jul. 3, 2008 EP05111274.

(Continued)

Primary Examiner — Laura Edwards

(74) Attorney, Agent, or Firm — Bejin, VanOphem & Bieneman PLC

(57) ABSTRACT

A dual action piston type metering device is installed between the color changer of a coating system and its atomizer, the metering cylinder of which includes two input ports with the color changer output ports connected to the atomizer. The dual action piston type metering device enables the alternating operation of the cylinder ranges (A/B-operation) with only one single metering cylinder.

12 Claims, 2 Drawing Sheets

FOREIGN PATENT DOCUMENTS

| | | |
|---|---|---|
| EP | 0366021 | 5/1990 |
| EP | 0443276 A1 | 8/1991 |
| EP | 0693319 | 1/1996 |
| EP | 0796664 | 9/1997 |
| EP | 0796665 | 9/1997 |
| EP | 0967016 | 12/1998 |
| EP | 1279440 | 1/2003 |
| EP | 1285733 | 2/2003 |
| EP | 1314483 | 5/2003 |
| EP | 1360996 | 5/2003 |
| EP | 1362642 | 5/2003 |
| EP | 1367302 | 12/2003 |
| EP | 1369183 | 12/2003 |
| EP | 1384885 | 1/2004 |
| EP | 1666158 | 6/2006 |
| EP | 1666159 A2 | 6/2006 |
| WO | WO2004037436 | 5/2004 |
| WO | WO-2008071273 A2 | 6/2008 |

OTHER PUBLICATIONS

English Abstract EP1369183.
English Abstract DE10103067.
English Abstract DE19524853.

* cited by examiner

PROCEDURE AND PISTON TYPE METERING DEVICES FOR THE METERED MATERIAL SUPPLY FOR A COATING DEVICE

CROSS-REFERENCE TO RELATED APPLICATIONS

This application claims benefit of U.S. Provisional Patent Application Ser. No. 60/729,442 filed on Oct. 21, 2005 which is incorporated by reference herein in its entirety.

FIELD OF THE INVENTION

This invention covers a procedure and a piston metering device as well as a coating system using a piston type metering device of this nature. By way of example and not limitation, the invention may be for the electrostatic production coating of work pieces such as motor vehicle bodies with water paint or similarly conductive coating materials of frequently changing colors.

BACKGROUND

For the electrostatic coating with direct charging of an electrically conductive coating material of different colors, it has been customary for some time to use an intermediate container, which is supplied by the atomizer. The required potential separation between the color changer can be provided between the one grounded and the atomizer running on high voltage. This container can also be filled by the color changer, if the high voltage at the atomizer has been switched off or the feed line to the atomizer has been emptied prior to the supply flow crossing the insulation gap of the supply line. The insulation gap must be recreated between the container and the color changer, for example by draining the supply line of the container (EP 0 292 778 A2; U.S. Pat. No. 4,932,589; DE 199 37 426 A1; EP 1 314 483 A2; and EP 1 362 642 A1). It is especially advisable to design this intermediate container as a metering cylinder, depending on the range of production colors, precisely for the metering of the atomizer and, for this purpose, it would be configured to include an electrical motor driven by a threaded spindle and by a small piston rod driven piston.

If only one single intermediate container is to be used, as previously done after its discharge, the coating process had to be interrupted until the container had been recharged by the color changer. For the above mentioned state of the art, and to prevent this disadvantage, it has been customary and common to connect two alternating metering cylinders in parallel (A/B-operation) between the color changer and the atomizer, so that during the supply of the atomizer from the other container, the idle metering cylinder may be recharged. Aside from the two separate metering cylinders and their expense, this well known configuration has however the disadvantage of requiring more space, which in some cases may be undesirable, as for example in limited interior spaces of painting machines, such as in the front arm of a robot. Particularly undesirable is a higher space requirement of the additional metering cylinder, if it is to be self-installed into the atomizer, as this tends to make it to unwieldy for the accessibility of work areas or interior areas, or into the wrist of a painting robot as described in the concurrent German Patent Application 10 2004 058 054.

SUMMARY

Other applications of the present invention will become apparent to those skilled in the art when the following description of the best mode contemplated for practicing the invention is read in conjunction with the accompanying drawings.

Based on the cited state of the art, one objective of the invention includes the prevention caused by time lost by recharging of a metering cylinder, with minimal space required.

The invention is based on the recognition that one material supply similar to the previously customary A/B-operation of a coating system can be realized without interruption by the recharge process using one single metering cylinder with two ranges on equal axes, unless as previously practiced, one uses only one input port and one output port for the connection to the color changer valve arrangement or other materials resources, and two output ports to the atomizer or any other coating device. As used herein, the terms "input port" and "output port" does not limit the flow of materials to one single direction, since materials can be fed through the output ports and back to the metering cylinder, and/or from the metering cylinder through the input ports back to the material resource. In other words, in place of the generally known, single-action piston metering device one installs a dual-action piston-metering device, according to the invention, the piston of which can feed material to the atomizer, during each of its two opposing movements and which thereby performs an alternating operation of its cylinder ranges (A/B-operation) possible.

In the simplest of cases, all that's needed for the piston arrangement of the metering cylinder is a single metering drive, so that compared with the known A/B-systems it saves not only half the space but also half the effort for the drive system.

Moreover, this invention has other substantial advantages. This includes among other things, shorter color changing times and easier rinsing during color change. Furthermore, due to the possibility of continuous or quasi continuous feeding of the atomizer, this makes it possible to recharge the metering cylinder with smaller volumes, whereas container sizes have previously been so selected that each material content was sufficient for the painting of a work piece or for a work piece range, and that the maximum paint quantity required, regarding the various types of work, was fillable. This again allows the reduction of space in design.

Specific advantages are obtained when in the further development of this invention in the only existing metering cylinder, two independently driven piston elements move relatively toward another. This enables a continuous painting operation with unlimited paint supplies, without a high-voltage shut-off since during the paint supply to the atomizer from the one range of the metering cylinder, not only the other range must be recharged, but this range can already be isolated from the color changer by discharging of the connecting line.

The electrostatic coating with conductive materials, and the required potential separation between the atomizer running on high voltage, and the normally grounded color changer, is achieved for the above described piston metering device primarily through an insulation medium or insulation element within the metering cylinder and, furthermore, in a generally known manner, e.g., by discharging of the connecting line between the color changer and the range of the metering cylinder, from which subsequently the atomizer is fed, For the discharge of lines for the potential separation especially from the above mentioned state of the art, the well known scraping technology may be used. The piston type metering device may also be used for the coating operation without high voltage and/or for non-conductive coating materials, such as, for paints diluted with conventional solvents, which does not require a potential separation.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
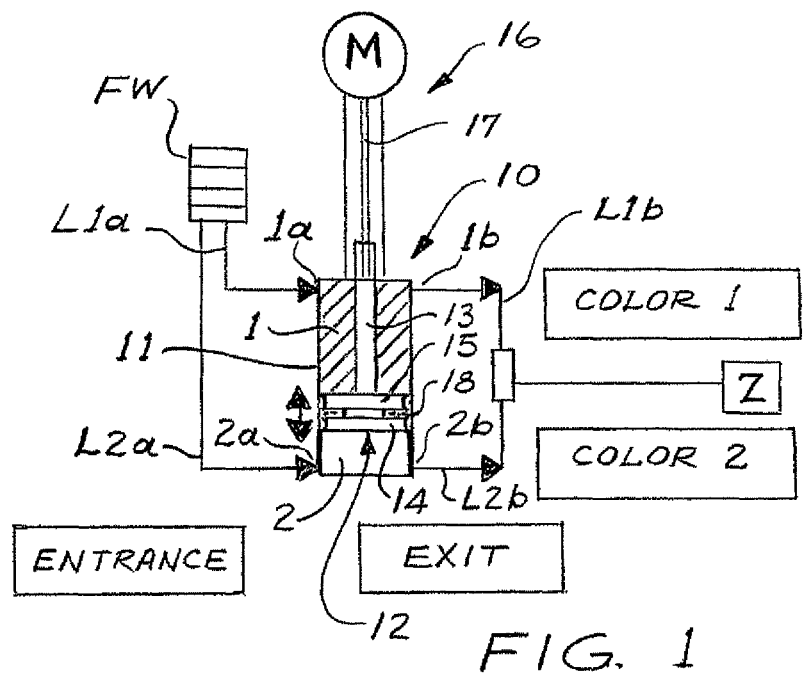
FIG. 1 is a schematic and oversimplified view of a coating system with one embodiment of a piston metering device, according to the invention.

The piston metering device 10 shown in FIG. 1 of the coating system, e.g., that of a painting robot, is installed between one of the conventional dual valve configuration color changer FW and a likewise common atomizer Z. The atomizer may e.g., be a rotational atomizer or air atomizer and may work electrostatically or without high voltage. In electrostatic coating systems, the color changer is grounded.

The piston metering device 10 in general, includes the metering cylinder 11 with a piston configuration 12 that is adjustable in the metering cylinder, as illustrated by means of two piston elements 14, 15 interconnected with a piston rod 13. The metering cylinder 11 may in a generally know manner (EP 1 384 885 A1) be made of ceramics and, for e.g., have a circular or oval cross-section. The two piston elements 14 and 15 have a shape corresponding to this cross-section, and fit tightly along their circumference using sealing lips on the metering cylinder 11. With respect to the drive system of the piston configuration 12, there is a metering drive 16 provided outside the metering cylinder, which, may e.g., include an electrical stepping motor M, controlled by one of the program controls of the coating system, with associated gear box and a threaded spindle 17. Alternatively, there may also be other generally known drive mechanisms provided to perform the same function.

According to this embodiment of the invention, between the sealing lips of the two piston elements 14 and 15 there is fluid, and preferably paint compatible, insulation medium located in a sealed space 18. The volume of the insulation medium is sufficiently large so that between the two sides of the piston configuration 12 and the chambers 1 and 2 of the metering cylinder 11, one set for 100 kV and the other set for ground potential for the coating material, can be contained with the required electrical insulation guaranteed. With an appropriately large space between the piston elements 14 and 15, the desired high voltage insulation gap can also be formed by an insulation gap, using air or other insulating gas.

Each of the two chambers 1 and 2 is connected to the sprayer/atomizer, through one input port 1a or 2a and one connected input line L1a or L2a with the color changer, and through each output port 1b or 2b and one connected output line L1b or L2b. The input port 1a and the output port 1b are located at the one face end of the metering cylinder 11 or nearby, while the input and the output ports 2a and 2b can be located at the opposite face end of the metering cylinder 11 or nearby. The input and output ports, e.g., may be located in the cylindrical sidewall or in the face walls of the metering cylinder and opened and closed by program controlled valves (not shown).

In some cases it may be advisable to configure the input lines L1a or L2a and/or the output lines L1b or L2b at least in part, as scraping hose or pipe spirals, during which the windings of the two lines may be interlocked and/or wound up in a minimum of two layers. When made of insulated materials, during electrostatic coatings these spirals enable the potential separation between the grounded supply systems in the least possible space.

When the sprayer/atomizer is operated with high voltage and if it is to be fed with conductive paint using the color change process, starting with the empty metering cylinder and empty metering lines, a procedure with the following steps may occur.

a) Charging of the metering cylinder with a primary paint using line L1a and the input port 1a, while the piston configuration 12 in FIG. 1 moves downward. Since line L1b is still empty, the high voltage at the atomizer may already be turned on unless it is turned on by the subsequent pressing of the paint on the atomizer.

b) Feeding of the first paint through the output port 1b and the line L1b to the atomizer through the piston arrangement (moving upward) in FIG. 1 (chamber 1 under high voltage), and simultaneously, as a rule, the complete filling of the metering cylinder through the line L2a and the input port 2a with a second color (chamber 2 grounded).

c) When painting is finished: pushing back of the potential paint remnants from the metering cylinder to the color changer for recovery, as well as for the discharge and rinsing of the coating system including the metering cylinder and the input and output lines.

d) Feeding of the second color from chamber 2 via the output port 2b to the atomizer by means of downward movement of the piston arrangement 12 and, simultaneously, filling of chamber 1 via the input port 1a with new color.

e) Painting with the new color, etc.

At the end of a paint process, the high voltage is turned off. It may also remain turned on, if not only the lines L1a and L2a but also the discharged lines L1b and L2b become insulated gaps.

In other cases, the operational method described may change. If, e.g., there is no color change, the coating system does not require any rinsing, and if the high voltage at the end of the painting process is turned off, and remains off until the discharge of the input lines (or until another insulation gap is set up,) the coating material remaining in the output lines must not be removed but may be pressed and sprayed during the next paint process by the new paint to the atomizer.

If an atomizer is operated without high voltage, then there is no need to create insulation gaps by draining of lines. On the other hand, insulation gaps required for the electrostatic coating in the input and output lines may also be formed in a different manner than by their discharging.

Figure 2:
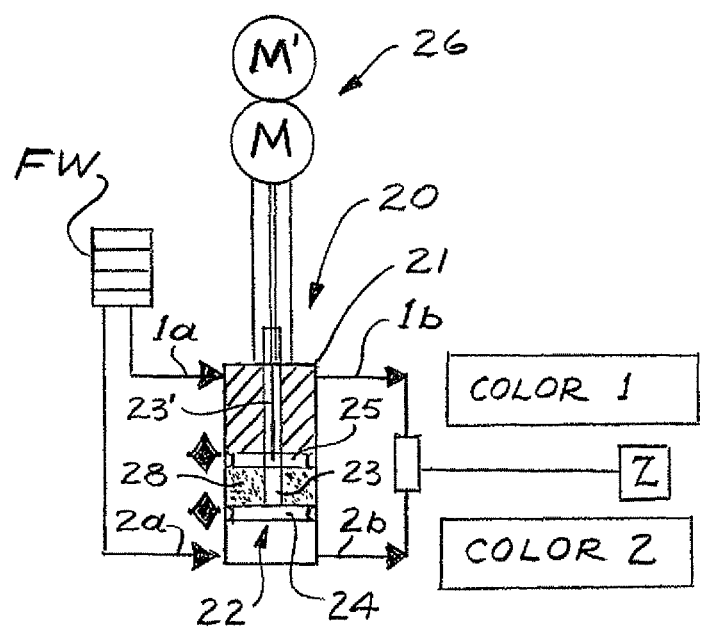
FIG. 2 is a view similar to FIG. 1, of a coating system with another embodiment of the piston metering device.

The coating system according to FIG. 2 corresponds to the one according to FIG. 1 except for the piston metering device 20, which differs from the piston metering device 10 regarding the piston arrangement 22 and the metering drive 26. The piston arrangement 22 of this embodiment is provided by two piston elements 24 and 25 which can move in both directions in the metering cylinder 21, either jointly or relative to one another. For this purpose, each piston element 24, 25, is a separate piston rod 23 and 23'. Each piston element 24 and 25 has its own program controlled motor M or M' which can drive its associated piston rod, e.g., similar to the way shown in FIG. 1.

This embodiment also has a liquid insulation medium 28 between the two piston elements 24 and 25, whose volume is expected to move relative to one another, and change independently with each of the piston elements. For example, the insulation medium 28 for this purpose under an independent metering device (not shown) which drives the piston elements toward or apart from each other, periodically or continuously, or through the changing space between the piston elements 24 and 25 that increases and reduces its volume by in response to the piston movements. By means of the targeted change of volume of the insulation medium 28, it would also be possible, among other things, to adjust the charge volume of the chambers 1 and 2 of the metering cylinder, e.g., dependent on the work piece to be painted or the work piece area. It would also be possible in chamber 2 to account for the reduction of the charge volume in chamber 1 due to the volume of the piston rods 23, 23' in order to compensate for errors.

In the embodiment of the space-saving piston metering device 20 displayed in FIG. 2, the two piston rods 23 and 23' are supported sliding into or out of each other, and guided out of the same face side of the metering cylinder. If there is sufficient room axially, on the opposite face side, the two piston rods may also extend in mutually opposite directions.

The procedure for the coating system according to FIG. 2 may to a great extent follow the operation according to FIG. 1, but because of the different piston control system there will be some important additional options. Especially advantageous is the option, while feeding the atomizer from one chamber 1 or 2 with the one piston element, the chamber can be filled expeditiously by means of the independent movement of the other piston element, and to use the time gained for the discharge of the supplying chamber prior to the discharge of the other supplying chamber. Consequently after the discharge of the first chamber and without turning off the high voltage, the feeding of the coating material from the second chamber to the atomizer may begin immediately, which enables a continuous coating operation for which an unlimited paint volume would be available.

Figure 3:
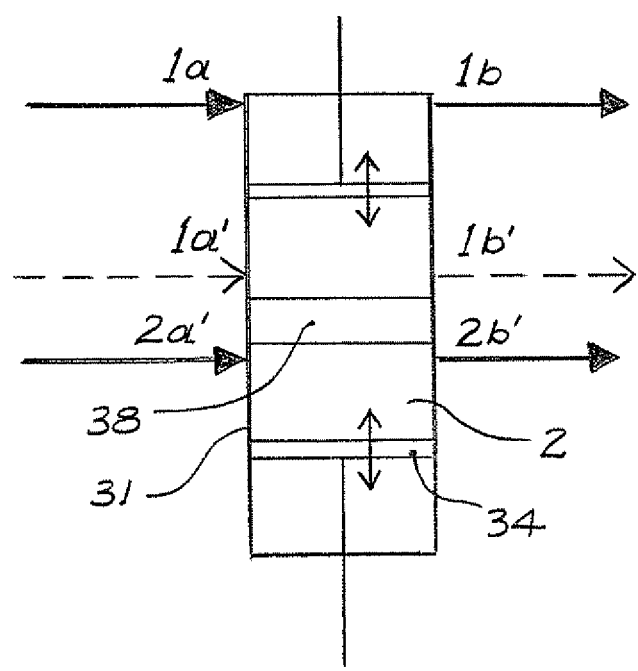
FIG. 3 is a schematic view of yet another embodiment of the piston metering device.

Regarding the location, the embodiment according to FIG. 2 may be modified by a minimum of two of the four input and output lines according to FIG. 3. Likewise there are two piston elements 34 and 35 provided, each driven by a metering motor and in either direction relatively movable with respect to one another. For example, the input port 2a and the output port 2b may be in this variation but as displayed, located on a central axial position of the metering cylinder 31 while the input and output ports 1a or 1b of the other range of the metering cylinder are located either on their respective face ends or, instead as shown by the input port 1a' and the output port 1b' may also be located on a central axial position of the metering cylinder 31. Both cases enable the same operational procedure as for the embodiment according to FIG. 2, if both cylinder chambers 1 and 2 are separated from one another by an insulating element 38. The insulating element 38 may contain an insulating fluid and can be installed in a fixed manner, but an externally controlled arrangement with adjustable volume for the insulating element would also be conceivable. One of the two piston rods 33 and 33' can be ducted through the insulating element 38 using a seating system, and then extend in the same direction as the other piston rod.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A piston metering device for metered material feed, comprising:
    a metering cylinder which has input and output ports for automatically controlled connection to input and output lines;
    a coating apparatus connected to the output ports of the metering cylinder;
    a piston arrangement displaceable inside the metering cylinder, and;
    at least one driving element through which the piston arrangement is connected to at least one automatically controlled metering drive,
    wherein the metering cylinder is configured to meter coating material during application by the coating apparatus; and
    wherein the metering cylinder has two input ports and two output ports connecting the metering cylinder to the input and output lines, and a first one of the input ports is axially spaced with respect to the metering cylinder from a second one of the input ports and a first one of the output ports is axially spaced with respect to the metering cylinder from a second one of the output ports.

2. The piston metering device of claim 1, wherein one group of input and output ports is located at least adjacent to a first face end of the metering cylinder, and the other input and output ports, all located at least adjacent to an opposite face end of the metering cylinder.

3. The piston metering device of claim 1, wherein one group of input and output ports, all located at one intersection of the metering cylinder between opposite face ends, and the other input and output ports are also located at one of an intersection between opposite faces at a face end metering cylinder.

4. The piston metering device of claims 1, wherein the piston arrangement is formed by two piston elements between which an insulating material is provided with which on one side runs a high voltage potential, against on the other side, a low potential coating material is insulatable.

5. The piston metering device of claim 4, wherein the two piston elements are firmly joined, to one another as well as to common piston rods, forming a drive element.

6. The piston metering device of claim 4, wherein the two piston elements are movable relative to one another and, using one piston rod, each, are connected to one metering drive each.

7. The piston metering device of claim 6, wherein in a space between the two piston elements an insulating medium with controllable charging volume is introducible, and that along with a charge volume, the space between the piston elements is variable.

8. The piston metering device of claim 6, wherein the two piston rods can slide inside each other and exit from the same face end of metering cylinder.

9. The piston metering device of claim 1, wherein the at least one driving element is connected to the automatically controlled metering drive, with which a material quantity delivered to the coating apparatus can be varied automatically during a piston stroke of the metering cylinder.

10. A coating system for the production coating of work pieces, comprising:
    a piston metering device for metered material feed, comprising:
        a metering cylinder which has input and output ports for automatically controlled connection to input and output lines;

a coating apparatus connected to the output ports of the metering cylinder, a piston arrangement displaceable inside the metering cylinder, and;

at least one driving element through which the piston arrangement is connected to at least one automatically controlled metering drive, wherein the metering cylinder is configured to meter coating material during application by the coating apparatus; and wherein the metering cylinder has two input ports and two output ports connecting the metering cylinder to the input and output lines, and a first one of the input ports is axially spaced with respect to the metering cylinder from a second one of the input ports and a first one of the output ports is axially spaced with respect to the metering cylinder from a second one of the output ports; and a color change valve connected to the two input ports of the metering device, a coating apparatus connected to the two output ports of the metering cylinder, and wherein the metering drive is configured to meter coating material during application by the coating apparatus independent of a work piece range associated with the coating apparatus.

11. A piston metering device for metered material feed of a coating device, comprising:

a metering cylinder which has input and output ports for automatically controlled connection to input and output lines;

a piston arrangement displaceable inside the metering cylinder, and;

at least one driving element through which the piston arrangement is connected to an automatically controlled metering drive, wherein the metering cylinder has two input ports and two output ports connecting the metering cylinder to the input and output lines, and a first one of the input ports is axially spaced with respect to the metering cylinder from a second one of the input ports and a first one of the output ports is axially spaced with respect to the metering cylinder from a second one of the output ports; and wherein the piston arrangement is formed by two piston elements between which an insulating material is provided with which on one side runs a high voltage potential, against on the other side, a low potential coating material is insulatable.

12. The piston metering device of claim 11, wherein the two piston elements are movable relative to one another.

* * * * *